United States Patent
Arhab et al.

(10) Patent No.: US 6,938,743 B2
(45) Date of Patent: Sep. 6, 2005

(54) HYDROKINETIC COUPLING APPARATUS, IN PARTICULAR FOR MOTOR VEHICLES

(75) Inventors: Rabah Arhab, St Brice sous Foret (FR); Norbert Termenon, Amiens (FR); Daniel Bonnel, Amiens (FR)

(73) Assignee: Valeo Embrayages, Amiens Cedex (FR)

( * ) Notice: Subject to any disclaimer, the term of this patent is extended or adjusted under 35 U.S.C. 154(b) by 0 days.

(21) Appl. No.: 10/423,030

(22) Filed: Apr. 25, 2003

(65) Prior Publication Data

US 2003/0221926 A1 Dec. 4, 2003

(30) Foreign Application Priority Data

Apr. 30, 2002 (FR) .............................................. 02 05489

(51) Int. Cl.[7] .................................................. F16H 45/02
(52) U.S. Cl. ...................................... 192/3.29; 192/212
(58) Field of Search ............................. 192/3.28, 3.29, 192/212, 214, 214.1

(56) References Cited

U.S. PATENT DOCUMENTS

| | | | |
|---|---|---|---|
| 4,974,710 A | 12/1990 | Murasugi | |
| 5,975,261 A | 11/1999 | Woerner et al. | |
| 6,142,272 A | 11/2000 | Meisner et al. | |
| 6,193,036 B1 * | 2/2001 | Arhab et al. | 192/3.29 |
| 6,223,872 B1 * | 5/2001 | Heller et al. | 192/3.29 |
| 2001/0007383 A1 | 7/2001 | Schmid | |
| 2001/0008197 A1 | 7/2001 | Maienschein et al. | |
| 2003/0089567 A1 * | 5/2003 | Bauer et al. | 192/3.29 |

FOREIGN PATENT DOCUMENTS

| | | |
|---|---|---|
| DE | 38 27 249 A1 | 2/1989 |
| DE | 198 38 445 A1 | 4/1999 |
| DE | 199 20 542 A1 | 11/1999 |
| DE | 198 26 351 A1 | 12/1999 |
| DE | 199 26 983 A1 | 12/2000 |
| DE | 102 12 281 A1 | 10/2003 |
| FR | 2 765 939 | 1/1999 |

* cited by examiner

Primary Examiner—Rodney H. Bonck
(74) Attorney, Agent, or Firm—Liniak, Berenato & White

(57) ABSTRACT

Hydrokinetic coupling apparatus with an axis of rotation X—X, in particular for motor vehicles, in which the connection without clearance between the turbine wheel, the turbine hub and the input element of the damping device is accomplished by axial rivets. Bearings (80) are axially interposed between turbine hub (14) and a hub of a reaction wheel (13).

9 Claims, 18 Drawing Sheets

HYDROKINETIC COUPLING APPARATUS, IN PARTICULAR FOR MOTOR VEHICLES

The present invention concerns a hydrokinetic coupling apparatus, in particular for motor vehicles.

There is already known, in the prior art, for example from the documents FR-A-2.765.939 and U.S. Pat. No. 5,975,561, a hydrokinetic coupling apparatus, in particular for motor vehicles, of the type comprising:

- a casing formed by a first shell and intended to rotationally connect a driving shaft and an impeller wheel;
- a turbine wheel rotationally fixed, through a connection without clearance, to a turbine hub which is able to be rotationally connected to a driven shaft by means of an input element of a damping device whose output element is rotationally fixed to the said driven shaft;
- a clutch for locking the coupling of the driving and driven shafts, acting between the turbine wheel and a second shell of the casing, and comprising an axially movable piston for disengageably connecting the turbine wheel to the driven shaft, the piston being intended to clamp at least one friction disc rotationally fixed on the one hand to the second shell of the casing by means of a first connecting piece and on the other hand to the damping device by means of a second connecting piece;
- the damping device comprising circumferentially acting elastic members interposed between two guidance washers forming the input element and a damper plate forming the output element, the input and output elements being rotationally connected with a capacity for angular movement which is limited by stop means.

The document U.S. Pat. No. 5,975,561 describes such a hydrokinetic coupling apparatus in which the turbine wheel is welded to the turbine hub and comprising a rotational connection without clearance, provided between the turbine hub and one of the guidance washers of the damper. This connection without clearance is achieved by cooperation of shapes between on the one hand lugs formed in the guidance washer and on the other hand openings in the turbine hub.

The hub of the damper, rotationally connected to the driven shaft, is produced in a single piece with the damper plate and comprises a bearing which extends axially and on which the turbine hub is mounted so as to rotate freely, the hubs of the damper and turbine being held axially by a ring, such as a circlip, mounted in a groove in the hub of the damper.

The hub of the turbine wheel comprises fingers extending axially in the opposite direction to the turbine wheel and which enter corresponding openings in the damper plate in order to effect a rotational connection with clearance, that is to say with the possibility of relative angular movement between on the one hand the guidance washers forming the input element of the damper, one of which is rotationally connected without clearance to the turbine hub, and on the other hand the damper plate of the damper forming the output element of the damper.

The document FR-A-2.765.939 also describes such a hydrokinetic coupling apparatus in which, as before, the turbine wheel is welded to the turbine hub.

Two rotational connections by meshing are provided, arranged essentially in the same axial position, one radially inside the other.

The first rotational connection without clearance is provided between the hub of the turbine wheel and one of the guidance washers forming the input element of the damper and is effected by cooperation of shapes. The second rotational connection with clearance is provided between the hub of the turbine wheel and the output hub of the damper so as to allow a relative rotation or angular movement between the two hubs.

In the design according to the prior art consisting of the documents mentioned above, the turbine hub is mounted so as to rotate freely on a part forming a bearing of the output hub of the damper, the hubs being held axially by a stop ring mounted in a groove in the output hub in order to form a unitary subassembly.

Thus distinct means are always provided for effecting the rotational connection without clearance, thus to say on the one hand the connection by welding between the turbine wheel and the turbine hub and on the other hand the connection by cooperation of shapes between the hub of the turbine wheel and one of the guidance washers of the damper.

Because of this, the assembly and mounting of the components also comprises a first operation consisting of effecting the connection by cooperation of shapes between the hub of the turbine wheel and one of the guidance washers of the damper, which forms a subassembly as soon as the stop ring is mounted for axially immobilising the two hubs, and a final operation consisting of effecting the rotational connection by welding the subassembly consisting of the damper and the turbine hub with the turbine wheel.

Such a design is not as simple as desired, the hub of the turbine wheel being complex and expensive to produce, in particular because of the many necessary machinings and processings peculiar to connections by meshing.

In addition, the assembly requires an additional part, such as a stop ring, for axially immobilising the hub of the turbine wheel with respect to the output hub of the damper and an operation of machining a groove on the bearing of the output hub on which the turbine hub is mounted.

The aim of the invention is in particular to produce a hydrokinetic coupling apparatus of the type mentioned above, which is as simple and economical as desired, both in manufacture and assembly.

To this end, the object of the invention is a hydrokinetic coupling apparatus of this type, characterised by the fact that the means of connection without clearance between the turbine wheel, the turbine hub and the input element of the damping device are axial rivets.

By virtue of the invention, the rotational connection without clearance between the turbine wheel, the turbine hub and one of the guidance washers forming the input element of the damping device is effected in a single operation by riveting.

Advantageously, the assembly according to the invention comprises a succession of riveting operations without its being necessary to provide a stop ring, nor to machine the groove in which the latter would be mounted.

According to other characteristics of the invention:

- the damper plate of the damping device comprises openings for the axial passage of riveting tools;
- the apparatus comprises spacers which axially position the guidance washers and the damper plate of the damping device;
- at least some of the rivets are extended axially forwards in order to form a spacer;
- the front free end of the spacers forms a rivet for crimping the front guidance washer;
- the stop means consist of circumferential apertures in the damper plate which each have the body of a spacer passing through them axially;
- the stop means comprise at least one radial lug fixed to the external radial periphery of the damper plate which is received with circumferential clearance in a housing;

the second connecting piece consists of the front guidance washer of the damping device;

when the output element, rotationally connected to the driven shaft, consists respectively of the damper plate fixed to a hub of the damping means, characterised in that the front guidance washer comprises means forming an axial stop towards the front of the hub, with the front lateral face of which the means cooperate;

friction means with axial elasticity are interposed between the turbine hub and the hub;

the turbine hub consists of an internal radial portion of the rear guidance washer.

Other characteristics and advantages of the invention will emerge from a reading the following description, for an understanding of which reference will be made to the accompanying drawings, amongst which:

FIGS. 1 to 3 illustrate a first embodiment of a hydrokinetic coupling apparatus according to the invention, in which the rotational connection with circumferential clearance comprising stop means is effected radially above the elastic members, that is to say at the external radial periphery of the damper plate and guidance washers;

FIG. 8 is a half view in axial section of a hydrokinetic coupling apparatus according to the invention;

FIG. 9 is a half view in axial section of an apparatus according to FIG. 8 along the line IX—IX in FIG. 10;

FIG. 10 is a front face view of the damping device;

FIG. 12 is a half view in axial section of a hydrokinetic coupling apparatus according to the second variant;

FIG. 13 is a half view in axial section of an apparatus according to the second variant along the line XIII—XIII in FIG. 14;

FIG. 14 is a front face view of the damping device;

In the following description, the identical, similar or analogous components are designated by the same reference figures.

Figure 1:
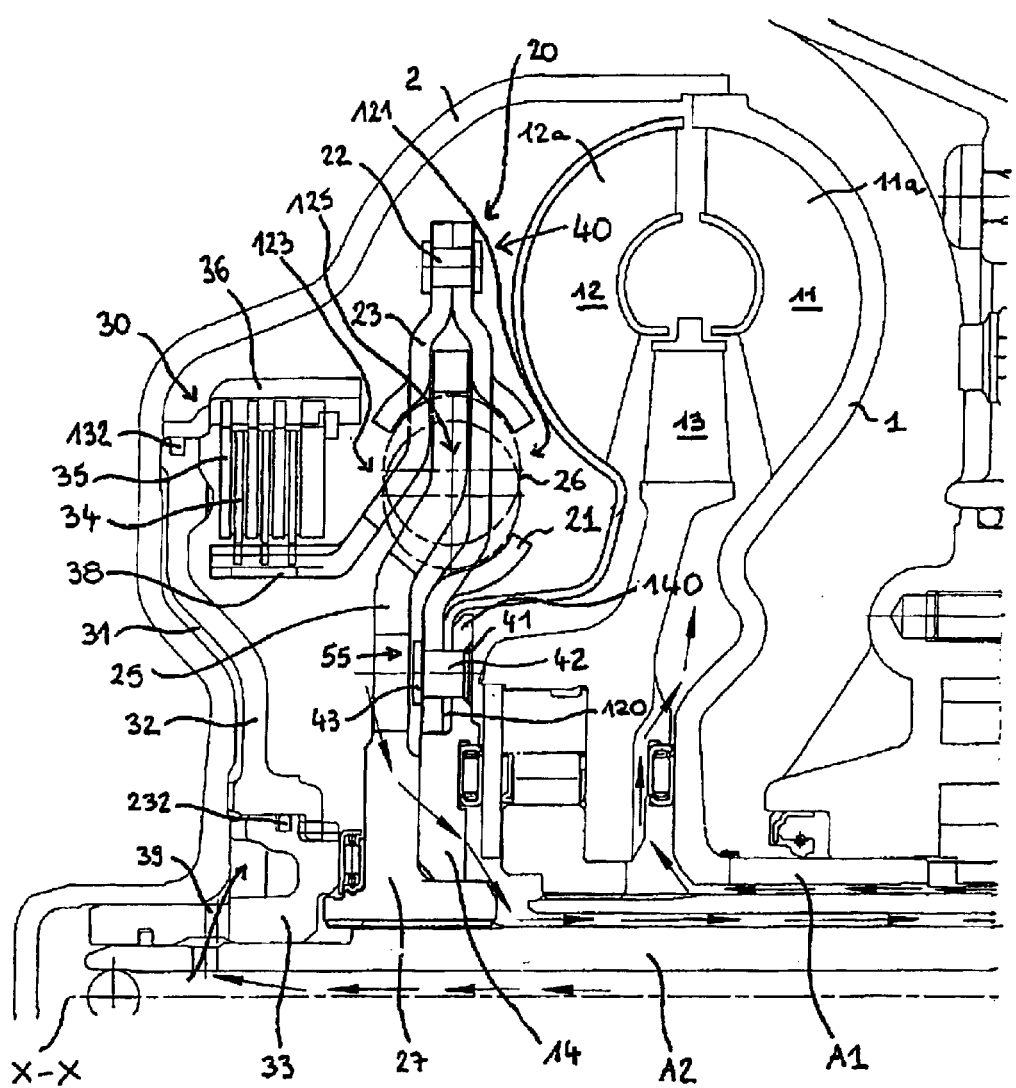
FIG. 1 is a half view in axial section of a hydrokinetic coupling apparatus according to the invention.

In order to facilitate understanding of the description and claims, "front" and "rear" orientations will be used, non limitingly, corresponding respectively to the left and right of FIG. 1 and the analogous figures, and the orientations "axial-radial" and "external-internal " with respect to the axis of rotation X—X of the hydrokinetic coupling apparatus.

As is known from the prior art, a hydrokinetic coupling apparatus as illustrated in FIG. 1 comprises, arranged in the same sealed casing, in two parts in the form of a shell, respectively front 2 and rear 1, filled with oil, a torque convertor and lock-up clutch 30.

The torque convertor comprises a rear impeller wheel 11, a front turbine wheel 12 and a central reaction wheel 13.

The impeller wheel 11 comprises blades 11a which are carried by a first rear shell 1 which is sealingly fixed to a second front drive shell 2, the shell 2 is able to be rotationally connected to a driving shaft (A1).

The shells 1, 2 are fluidtight, including inside the casing, and are preferably assembled by welding.

The turbine wheel 12 also comprises blades 12a which face the blades 11a of the impeller wheel 11, and the turbine wheel 12 is rotationally connected to a turbine hub 14 which is able to be rotationally connected to a driven shaft (A2) coaxial with the axis X—X of the apparatus, also by means of a damping device 20.

In the case of an application to a motor vehicle, the driving shaft (A1) consists of the crankshaft of the internal combustion engine of the vehicle, whilst the driven shaft (A2) consists of the input shaft of the vehicle transmission, connected to gear change means.

The hydrokinetic coupling apparatus 10 also comprises a lock-up clutch 30 for coupling the driving (A1) and driven (A2) shafts, this clutch being activated after starting of the vehicle and hydraulic coupling of the driving and driven shafts in order to avoid loss of efficiency caused in particular by phenomena of slip between the turbine wheels 12 and the impeller 11.

The apparatus 10 is here of the "3-way" type, that is to say, as can be seen according to the arrows depicted in FIG. 1, it comprises a first way supplying the hydraulic circuit of the convertor with fluid and a second outlet way, and a third way, independent of the first and second ways of the convertor, supplying the chamber 31, in order to move the piston 32 axially.

In a first operating phase, referred to as the convertor phase, the torque of the driving shaft (A2) is transmitted to the impeller wheel 11, which drives the turbine wheel 12 by circulation of oil between the blades 11a and 12a.

The turbine wheel 12 is rotationally fixed, by a connection without clearance, to a turbine hub 12 which is able to be rotationally connected to the driven shaft (A2) by means of a input element of the damping device or damper 20. The input element consists here of the guidance washers 21, 23 of the damper 20, one of which 21, referred to as the rear guidance washer, is rotationally connected by riveting, in accordance with the invention, to the turbine wheel 12 and its hub 14. The torque is then transmitted by the guidance washers 21, 23 to the damper plate 25 forming the output element of the damper 20, by means of circumferentially acting elastic members 26.

The output element of the damper 20 consists of the damper plate 25 which is rotationally fixed to a part forming hub 27. The damper plate 25 can be produced in a single piece with the hub 27 of the damper 20 rotationally connected, for example by flutes, to the driven shaft (A2).

During this converting phase, the damper 20 does not act in the damping of the torsion vibrations or oscillations resulting in particular from the irregular rotation speeds of the engine, which are not transmitted, or are only a little, since the transmission of the engine torque is effected solely by means of the kinetic energy of the oil in the convertor.

In a second phase, a fluidtight chamber 31 delimited axially by the shell 2 of the casing and a piston 32 is supplied, the axially movable piston 32 being able to axially clamp, under the action of the pressure of the fluid in the chamber 31, a clutch of the multi-disc type.

As can seen in FIG. 1, a clutch of this type comprises a plurality of plates 35 and friction discs 34 interposed axially between two successive plates 35, each friction disc 34 being provided with friction linings on its front and rear faces.

The plates 35 comprise at their external radial periphery teeth or any other means able to rotationally connect the plates 35 to a first connecting piece 36 by cooperation of shapes, the piece 36 being rotationally fixed to the shell 2, to which it is for example attached by welding.

The discs 34 comprise, in a similar manner to the plates 35, meshing means at their internal radial periphery able to provide the rotational connection with a second connecting piece 38 which is rotationally fixed to the input of the damper 20, for example the front guidance washer 23.

The piston 32 has at its external radial periphery an annular groove in which first sealing means are mounted, such as a segment 132, which cooperates with a facing surface of the first connecting piece 36 and at its internal radial periphery a surface able to cooperate with second sealing means, such as a segment 232, which is mounted in an annular groove of a hub 33 which surrounds the piston 32 with which it is rotationally connected by meshing.

The dynamic sealing means 132, 232 thus delimit the chamber 31, which is supplied with fluid through a hollow shaft, here the driven shaft (A2), passages 39 being provided in the hub or centring device 33.

In this second operating phase the piston 32 makes it possible to disengageably connect the turbine wheel 12 to the driven shaft (A2), the torque of the driven shaft (A1) is transmitted in the engaged state either when the piston 32 clamps the friction discs 34, by means of the multi-disc clutch to the damper, or more precisely to the guidance washers 21, 23 and to the elastic members 26 which damp the torsion oscillations and then, after angular movement of the connection with clearance, to the damper plate 25 which is fixed to the hub 27 rotationally connected with the driven shaft (18).

For more detail with regard to the design and functioning of a hydrokinetic coupling apparatus of this type, reference should be made to one or other of the documents FR-A-2.765.939 and U.S. Pat. No. 5,795,561.

In accordance with the invention, the mounting of the damping device 20 in the apparatus 10 takes place as described below.

The various elements forming the damper 20 are first of all pre-assembled in order to constitute a unitary subassembly.

According to certain embodiments or varients, it is necessary:

in a first operation, solely when the connecting piece 38 and the front guidance washer 23 are two distinct pieces, to rotationally connect these two pieces, for example by riveting or friction welding, and then, the elastic members 26 having been mounted, in a second operation, the two front and rear guidance washers 21, 23 together when necessary in order to produce the stop means 40 of the rotational connections with clearance or quite simply for the good mechanical strength of the damper 20.

The damping sub-assembly 20 thus pre-assembled can then be mounted in the apparatus 10 for a final mounting operation, which consists principally of rotationally connecting without clearance the rear guidance washer 21 with the turbine wheel 20 and the turbine hub 14, this connection being made in accordance with invention by riveting a series of axial rivets 42 and/or rivets forming spacers 46 distributed circumferentially around the axis X—X.

In a manner known per se, the damping device or damper 20 comprises two guidance washers, respectively front 23 and rear 21, forming the input element, and a damper plate 25 forming the output element, rotationally fixed with or without clearance to a hub 27 rotationally connected to the driven shaft (A2).

Figure 18:
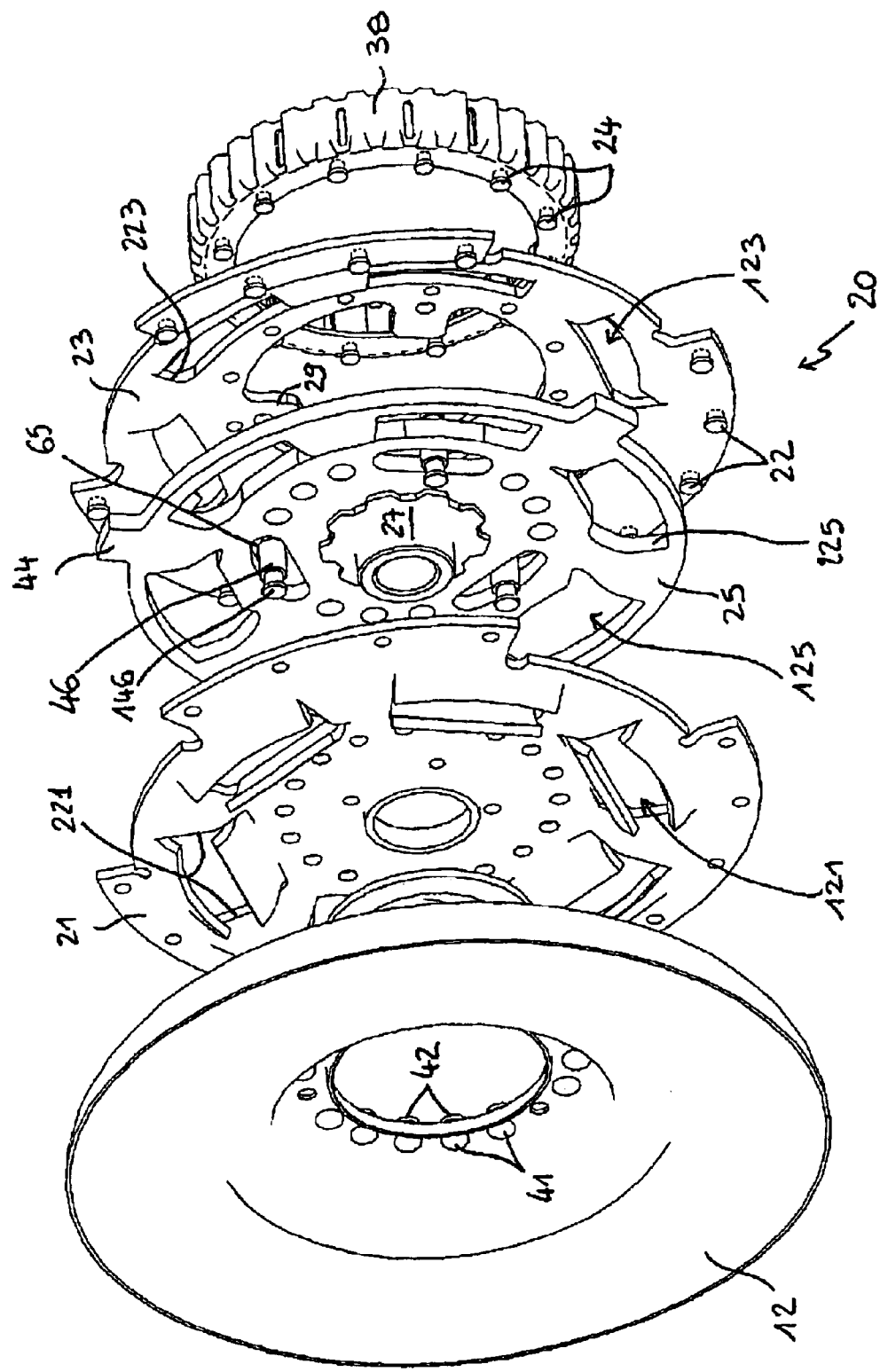
FIGS. 18 and 19 are front and rear views in perspective of a hydrokinetic coupling apparatus according to a third embodiment in which the rotational connection with clearance comprising stop means is effected radially above the elastic members as in the first embodiment and which also comprises spacers according to the second embodiment of the invention.
Figure 19:
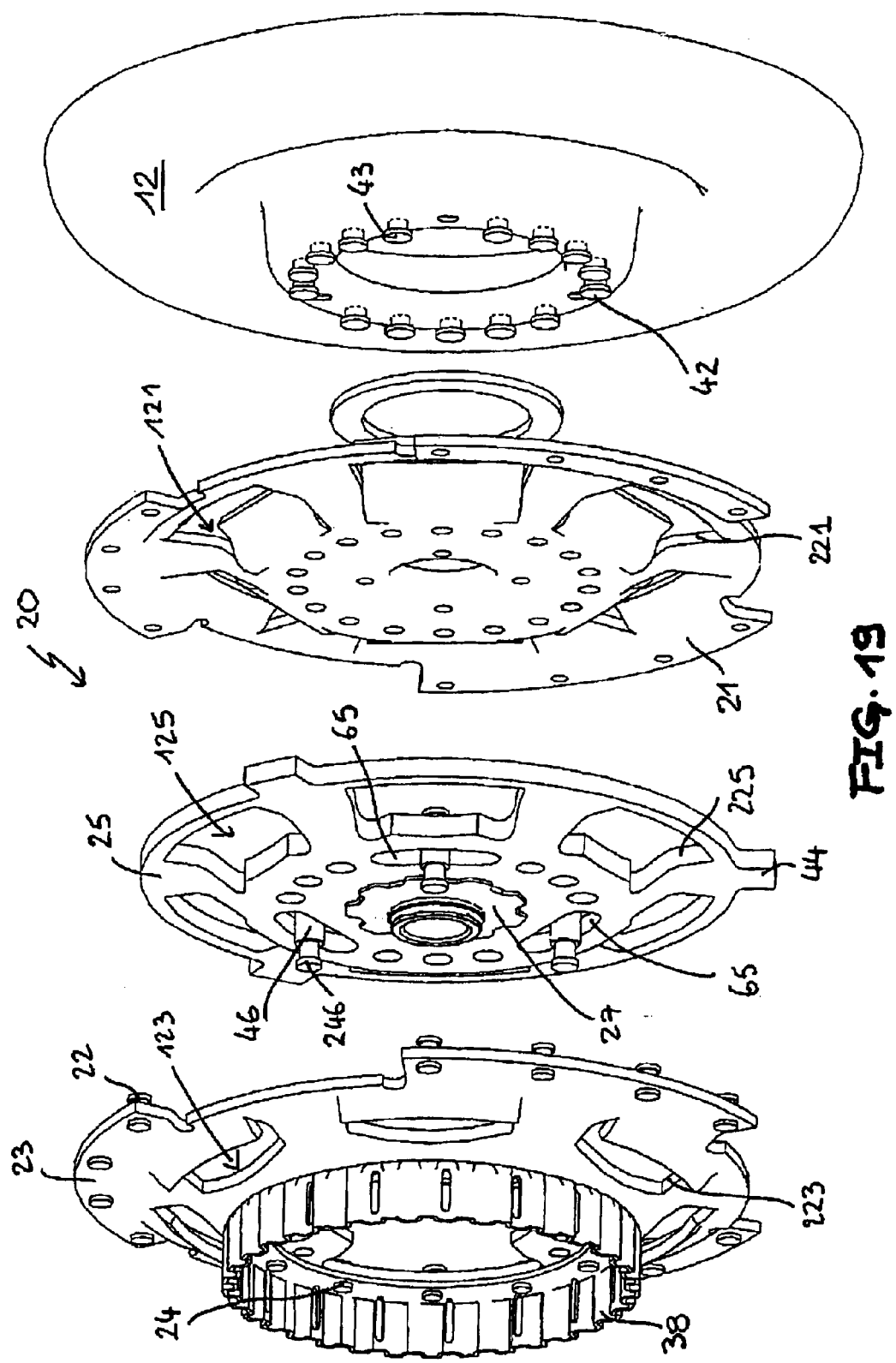

The various elements making up such a damper 20 can be seen more clearly in FIGS. 18 and 19, illustrating the third embodiment according to the invention and in which only the elastic members 26 have not been shown.

Circumferentially acting elastic members 26 are interposed between the input and output of the damper 20. To do this, the damper plate 25 comprises apertures 125 in which the elastic members 26 are mounted and the guidance washers 21, 23 also each comprise apertures 121, 123 disposed opposite the apertures 125 in the damper plate 25.

The elastic members 26 are in abutment respectively on the radially oriented edges 221, 223 of the apertures 121 and on the edges 225 of the apertures 125 in the damper plate. The elastic members 26 are held axially by the circumferentially oriented edges of the apertures 121, 123 in the guidance washers 21, 23.

The elastic members 26 are thus acted on between the input and output elements of the damper 20 within the relative angular clearance determined by the rotational connection with clearance in order to damp the oscillations.

As illustrated by the various embodiments of the invention which will be described in detail below, the rotational connection with clearance and the stop means can be produced for example either above the elastic members 26 of the damper 20, or below these members 26, the location and nature of the stop means 40 and of the connection being dependent on the application, in particular the torques to be transmitted.

FIG. 1 depicts an overall view of a hydrokinetic coupling apparatus 10 whose overall functioning, identical to that of the prior art, was stated above as a matter of principle.

Figure 2:
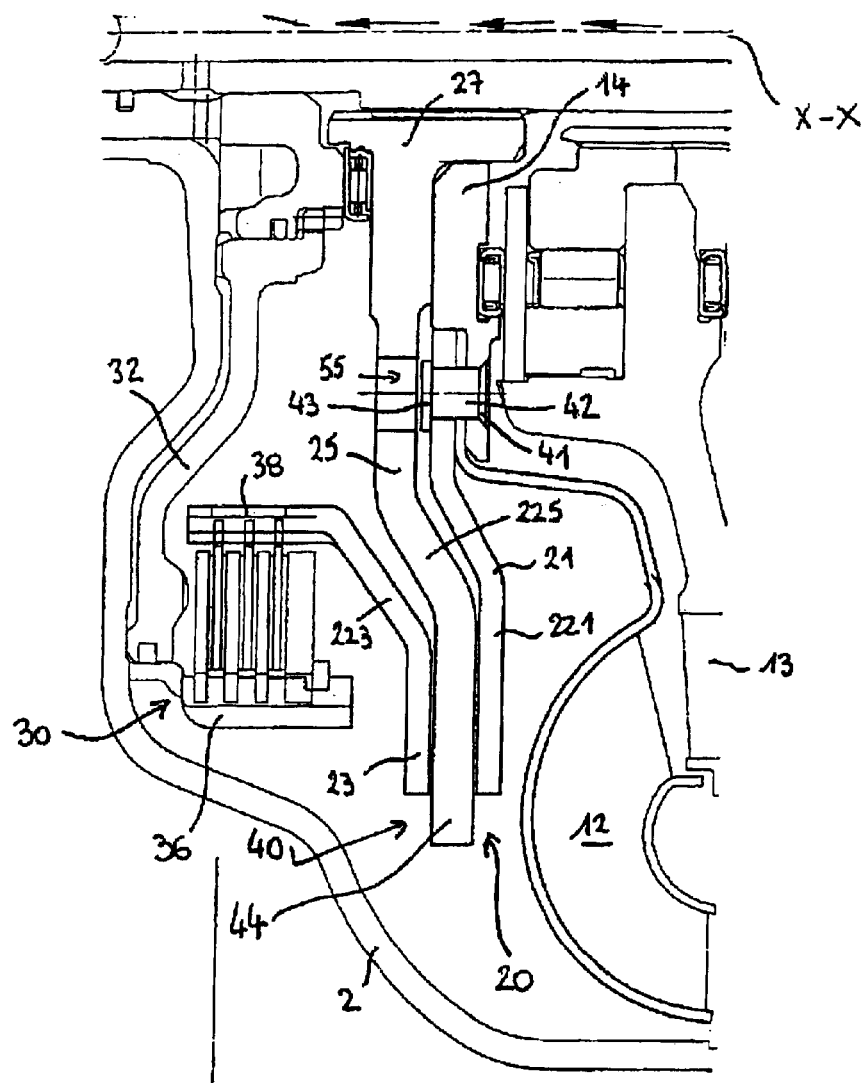
FIG. 2 is a half view in axial section of an apparatus according to FIG. 1 along the line II—II in FIG. 3.
Figure 3:
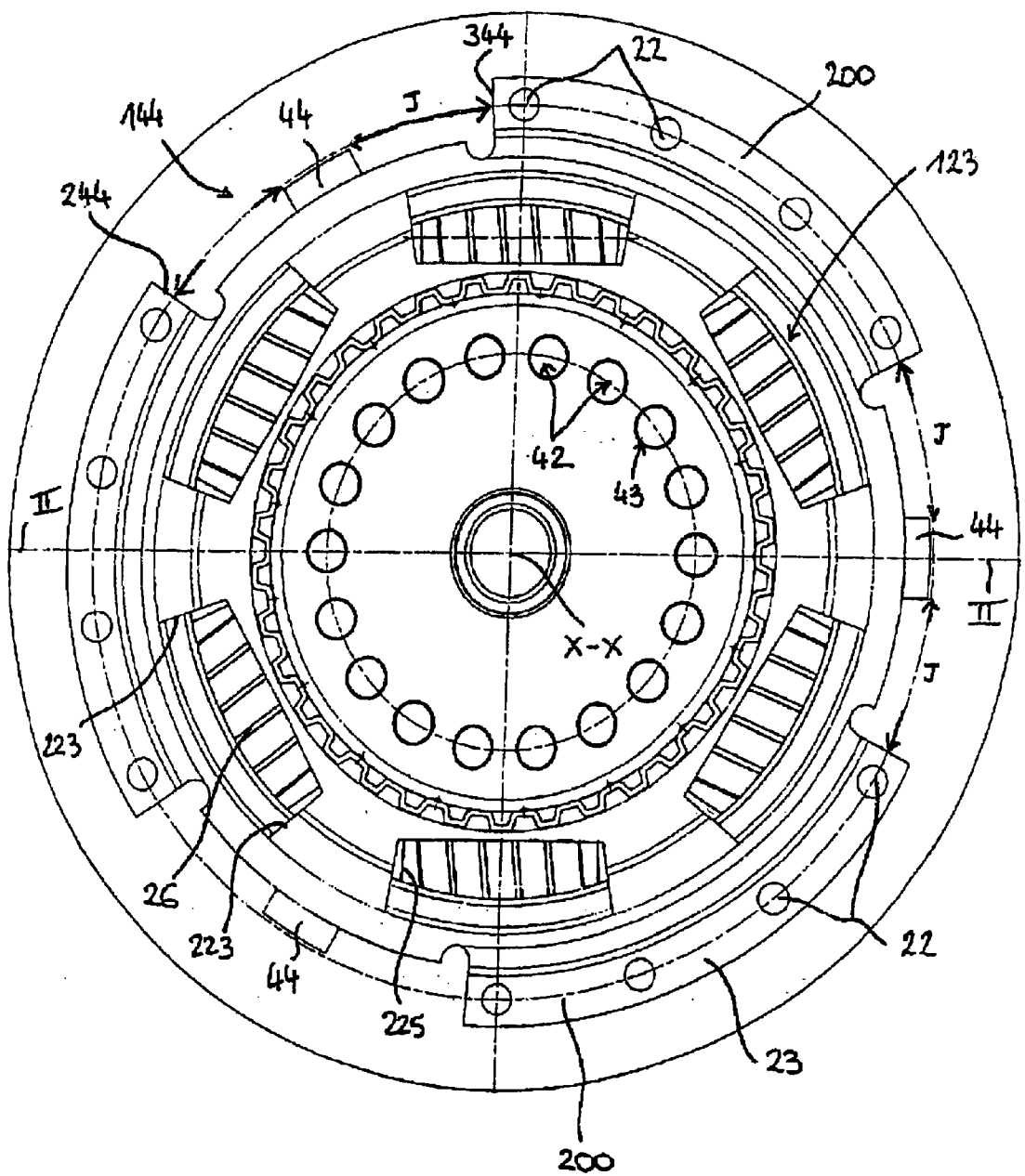
FIG. 3 is a front face view of the damping device illustrating a first embodiment of the stop means.

FIGS. 1 to 3 illustrate a first embodiment of a hydrokinetic coupling apparatus 10 according to invention in which the means of connection without clearance between the turbine wheel 12, the turbine hub 14 and the rear guidance washer 21 constituting the input of the damping device 20 are rivets 42.

According to this first embodiment, the mounting of the damper 20 in the apparatus 20 is effected by riveting, and openings 55 are provided in the damper plate 25 in order to allow the axial passage of the riveting tools and access as far as the rivets 42 of the rotational connection without clearance.

In a variant, there are provided, in accordance with the variants and embodiments, openings similar to the openings 55 in the front guidance washer 23 and/or the second connecting piece 38, these openings being arranged axially opposite the openings 55 to allow the passage of the riveting tools axially from front to rear.

The damper plate 25 of the damper 20 is here produced in a single piece with the hub 27. In a variant, the damper plate can be produced in two parts rotationally fixed together, for example by meshing.

The hub 27 comprises, radially inside, flutes for its rotational connection with the driven shaft (A2) and a portion forming a bearing extending axially-towards the rear, on which the hub 14 of the turbine wheel is mounted so as to rotate freely.

Advantageously, the hub 14 of the turbine wheel comprises, to the front and radially inside, a bevel to facilitate its mounting on the bearing.

By virtue of the connection without clearance according to invention and the simplified mounting resulting therefrom, it is not necessary to provide axial immobilisation means between the hubs 27, 14 in order to form a subassembly before rotationally connecting this subassembly to the internal radial periphery of the turbine wheel 12. The operation of riveting the rivets 42 advantageously makes it possible to obtain, in a single operation, the connection between the rear guidance washer 21, the turbine wheel 12 and the turbine hub 14.

To this end, the turbine hub 14 is shaped radially outside substantially in the form of an "L" and comprises a groove open towards the front in which the internal radial peripheries of the guidance washer 21 and turbine wheel 12 are positioned axially and towards the rear a part 140 in the form of a plate extending radially towards the outside.

The plate 140 has a front lateral face against which the rear lateral face of the turbine wheel 12 is pressed and a rear lateral face against which the rear head of the rivets 42 bears.

Thus the bodies of the rivets 42 pass axially from rear to front through the plate 140 of the hub 14, and then the internal radial periphery 120 of the turbine wheel 12 and the rear guidance washer 21. The rivets 42 comprise at each of the ends of the body a rear head 41 in abutment on the rear lateral face of the plate 140 and a front end 43 in abutment on the front lateral face of the rear guidance washer 21.

The internal radial periphery 120 of the turbine wheel 12 is therefore interposed axially between the rear guidance washer 21 and the plate 140 on the hub 14 and held axially by means of the rivets 42 in order to effect the rotational connection without clearance with the input of the damper 20.

In this first embodiment, the second connecting piece 38 is advantageously produced in a single piece with the front guidance washer 21 of the damper.

As can be seen in FIGS. 2 and 3, the damping device 20 comprises stop means 40 acting so as to limit the clearance or angular movement (J) between the guidance washers 21, 23 and the damper plate 25.

In this first embodiment, the stop means 40 are produced in the form of lugs 44, here three in number, distributed circumferentially in a regular manner and fixed to the external radial periphery of the damper plate 25.

As can seen in FIG. 2, the lugs 44 of the damper plate 25 extend radially towards the outside beyond the guidance washers 21, 23, which have circumferential housings 144 in the form of an angular sector determining, through their opposite circumferential ends 244 and 344, the angular movement (J) of the lugs 44 with respect to the guidance washer 21, 23.

The peripheral circumferential edges of the guidance washers 21, 23 are discontinuous and form in alternation housings 144 for the lugs 44 and connecting sectors 200 between the guidance washers 21, 23.

In the connecting sectors 200, the guidance washers 21, 23 are rotationally connected by rivets 22 and the radially external parts of the washers 21, 23 are offset axially towards each other with respect to the overall plane of each of the guidance washers so that they are substantially in the same plane as the damper plate 25, thus angularly delimiting the movement of the lugs 44.

Thus the lugs 44 can move angularly by the value (J) with respect to the guidance washers 21, 23 or more precisely as far as a maximum angle for which the lugs 44 come into abutment against the ends 244, 344 of the connecting sectors 200 of the guidance washers 21, 23.

During the angular movement (J) the elastic members 26 mounted in the apertures 125 in the damper plate 25 are compressed by the edges 221 and 223 respectively of the apertures 121 and 123 in the guidance washers 21, 23 in order to damp the torsion oscillations.

Figure 4:
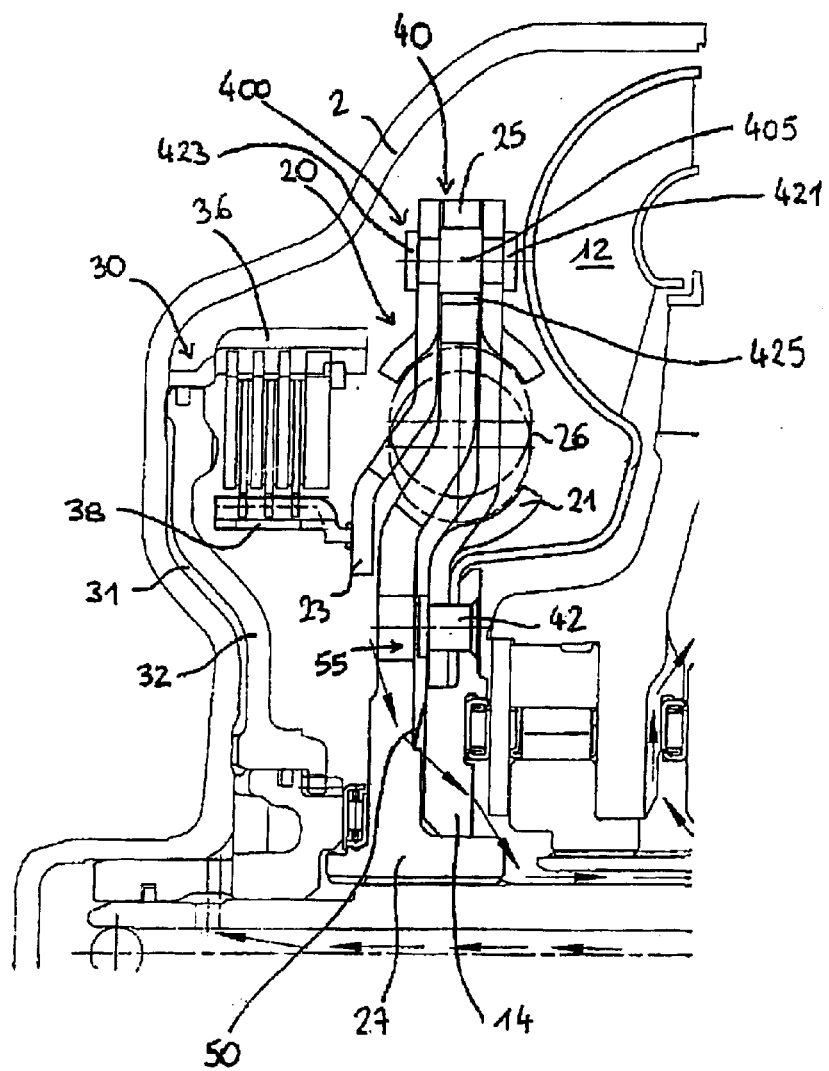
FIG. 4 is a half view in axial section of a hydrokinetic coupling apparatus which illustrates a first variant of the first embodiment, in which the stops means of the connection with clearance of the damper consist of spacers arranged at the external radial periphery of the damper and in which the second connecting piece is fixed to the front guidance washer.

FIG. 4 illustrates a first variant of the first embodiment in which the second connecting piece 38 is distinct and is attached to the front guidance washer 23, here by friction welding, or in a variant by any equivalent means.

Friction means 50 with axially elasticity, such as a washer, are interposed between the output hub 27 or the damper plate 25 and the turbine hub 14. The output hub 27 or the damper plate 25 comprises in its rear face opposite the turbine hub 14 a countersink in which the washer 50 is centred by means of its internal radial periphery.

In a variant, the friction means 50 consist of a friction washer in the form of a ring.

The stop means 40 consist here of spacers 400 which are fixed to the guidance washers 21, 23 and whose bodies 405 pass through the damper plate 25 at apertures 425 such as oblong holes or in a variant housings similar to the housings 144 which extend circumferentially and are produced by cutting in the damper plate 25.

The distance between the opposite circumferential ends of the apertures 425 determines the maximum relative angular movement between the guidance washers 21, 23 and the damper plate 25 which makes it possible to compress the elastic members 26 and thus obtain damping of the torsion oscillations.

As can be seen in axial section in FIG. 4, the spacers 400 comprise at each of their ends heads, respectively front 423 and rear 421, which are in abutment on the front and rear lateral faces of the corresponding guidance washer 21, 23.

Figure 5:
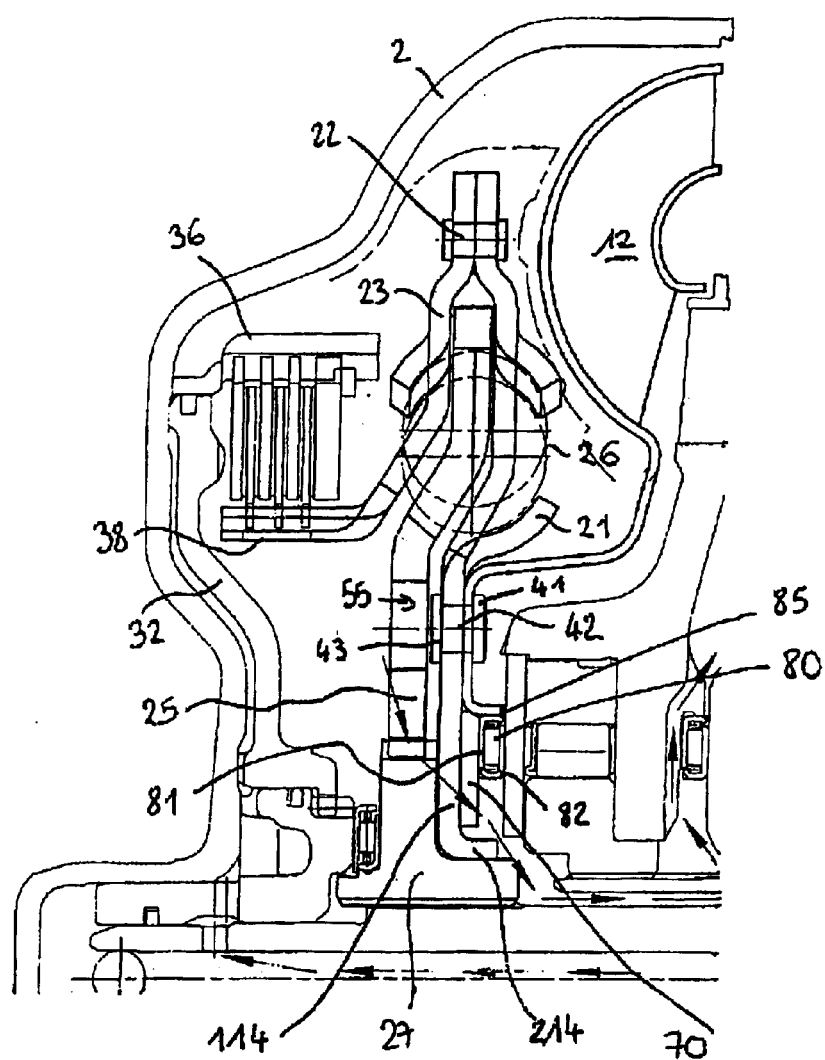
FIG. 5 is a half view in axial section of a hydrokinetic coupling apparatus which illustrates a second variant of the first embodiment, in which the output hub of the damper and the damper plate are produced in two parts and the hub of the turbine wheel consists of the rear guidance washer.

FIG. 5 is a half view in axial section of the hydrokinetic coupling apparatus which illustrates a second variant of the first embodiment, in which the damper plate 25 and the hub 27 are produced in two parts rotationally fixed to each other and in which the hub 14 of the turbine wheel is formed by a radially internal part 144 of the rear guidance washer 21.

The hub 14 of the turbine wheel consists here of the rear guidance washer 21 which extends radially towards the inside as far as the bearing of the output hub 27 on which it is mounted so as to rotate freely. More precisely, the radially internal part of the washer 21 has substantially a cross section in an "L" shape and comprises an arm axially oriented towards the rear forming a sleeve 214 able to be mounted on the bearing of the output hub 27.

The rear guidance washer 21 is here made from sheet metal treated for example by carbonitriding, which may cause defects in surface evenness liable to give rise to stresses in the bearing means 80 interposed axially between the turbine hub 144 and the hub 113 of the reaction wheel 13.

This is the reason why a shim 70 is provided, interposed between the part 114 of the washer 21 forming a turbine hub and bearing means 80. The bearing means 80 consists here of a needle thrust bearing 80 comprising rolling elements mounted between two radial plates, front 80 and rear 82.

Figure 6:
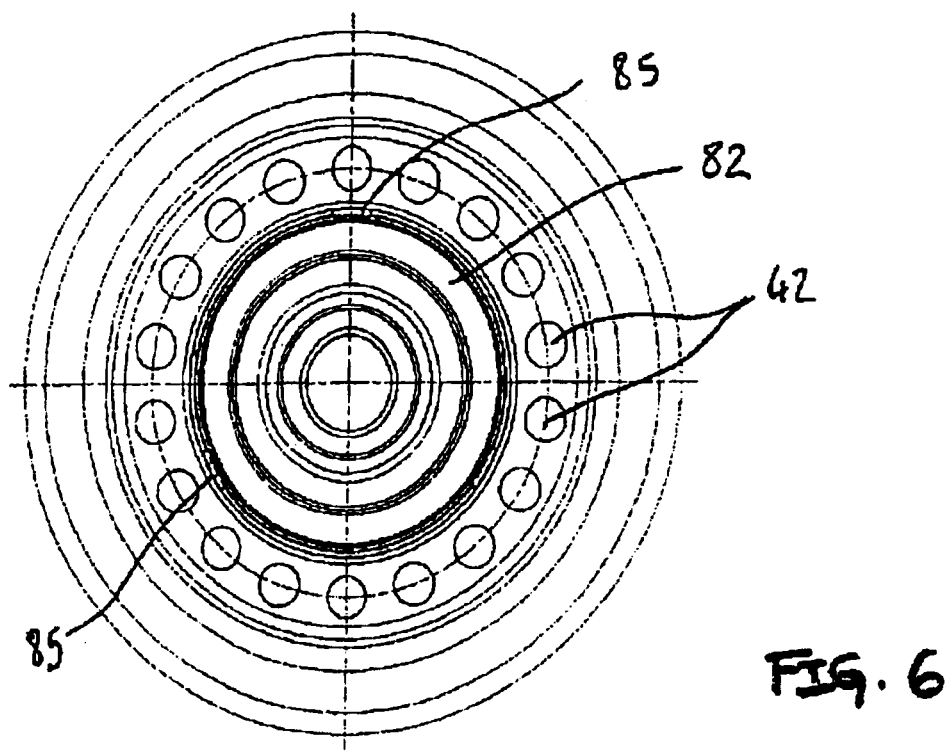
FIGS. 6 and 7 are front and detail views, respectively front and rear view, of an apparatus according to FIG. 5.
Figure 7:
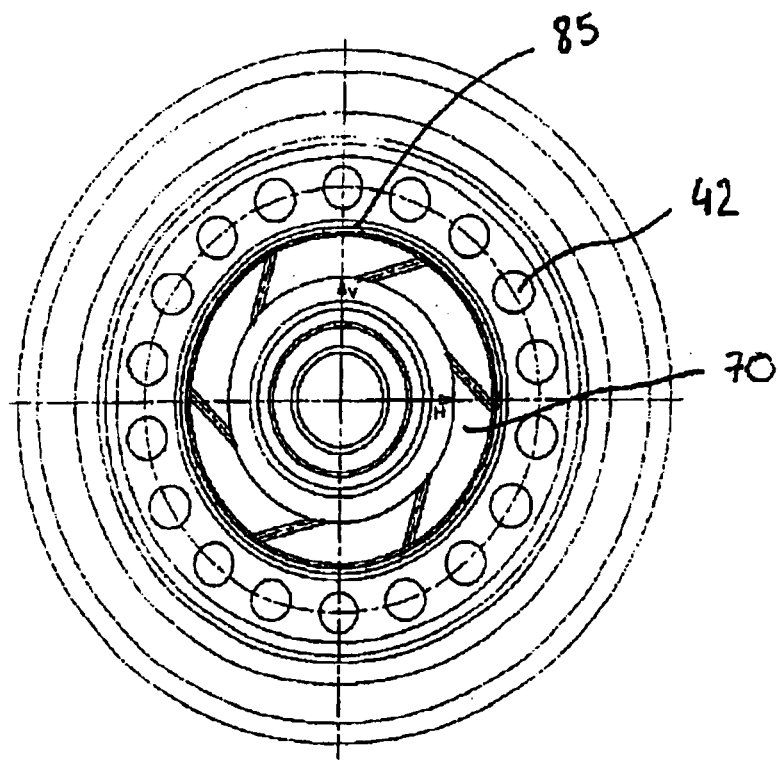

As can be seen in FIGS. 6 and 7, the needle thrust bearing 80 is rotationally fixed to the internal radial periphery of the turbine wheel, here by crimpings 85, which advantageously make it possible to produce a subassembly consisting of the needle thrust bearing 80, the shim 70 and the turbine wheel 12 so that the mounting and assembly of the damper 20 is facilitated thereby.

According to the invention, in order to effect the connection without clearance between the turbine wheel 12 and the rear guidance washer 21, the rivets 42, comprise a body passing axially through the two pieces to be connected and front 41 and rear 43 heads in abutment on the lateral faces of each of these pieces.

Figure 8:
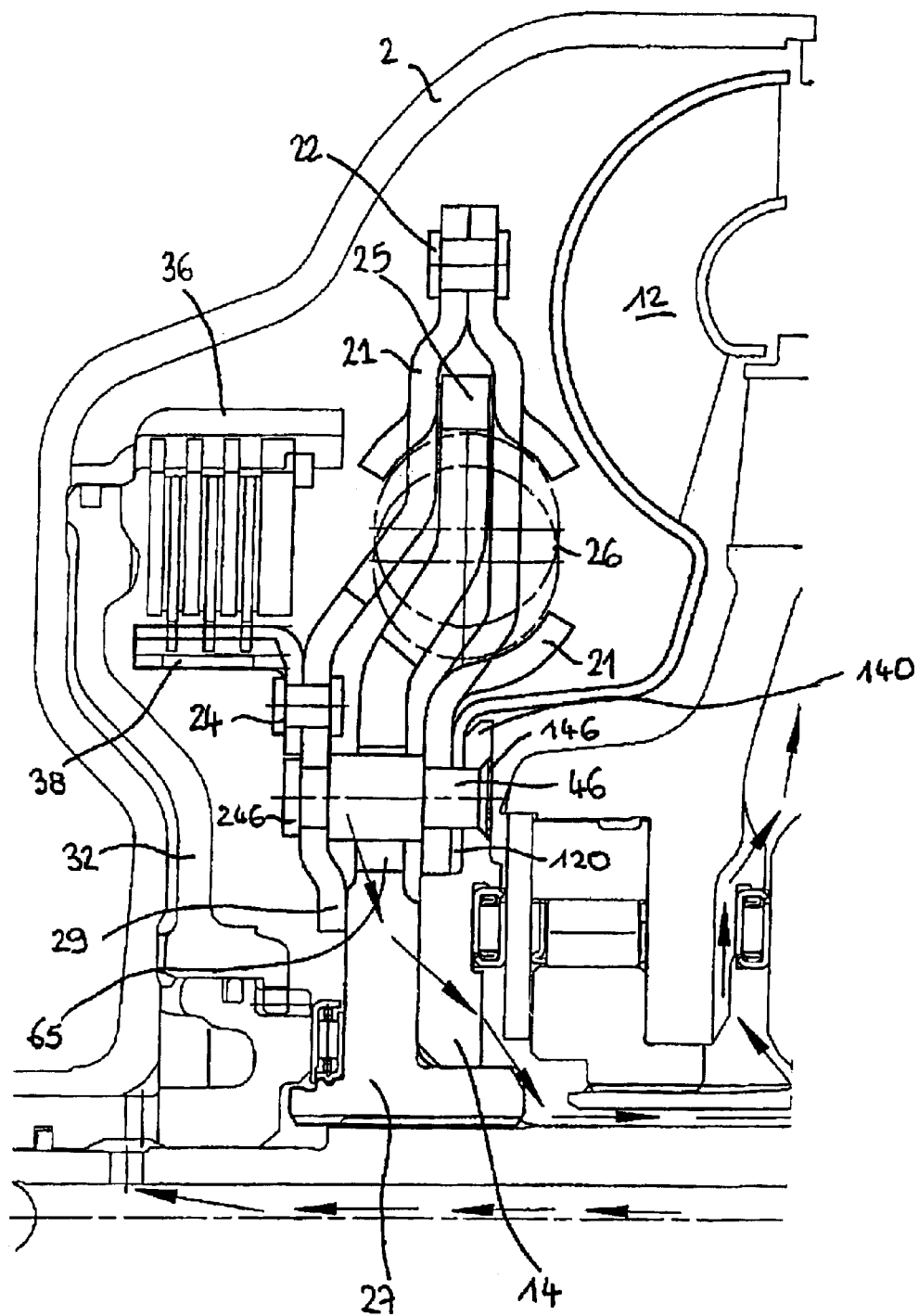
FIGS. 8 to 10 illustrate a second embodiment of a hydrokinetic coupling apparatus according to the invention, in which the rotational connection with clearance comprising stop means is effected radially below the elastic members, by means of axial spacers.
Figure 9:
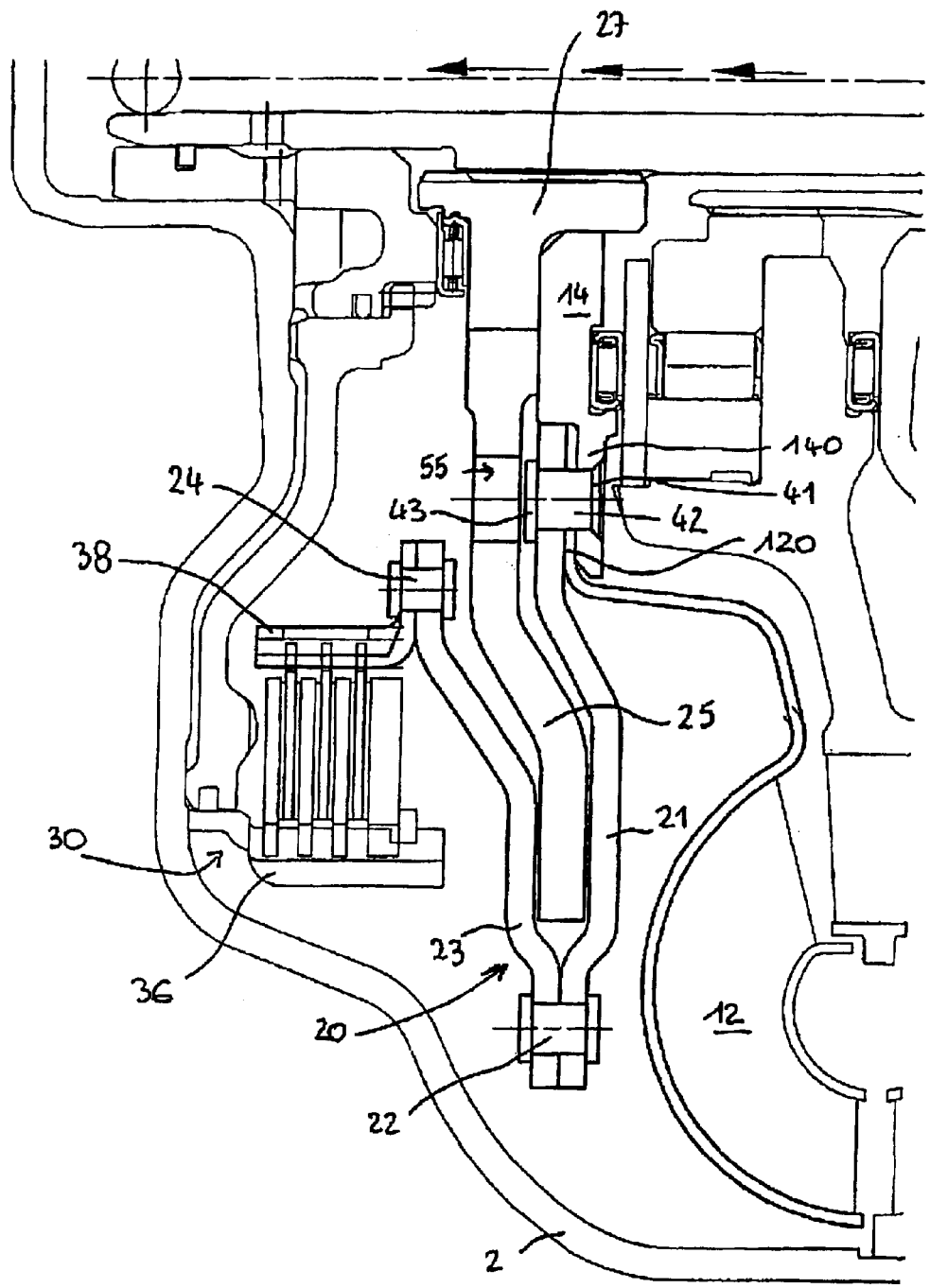
Figure 10:
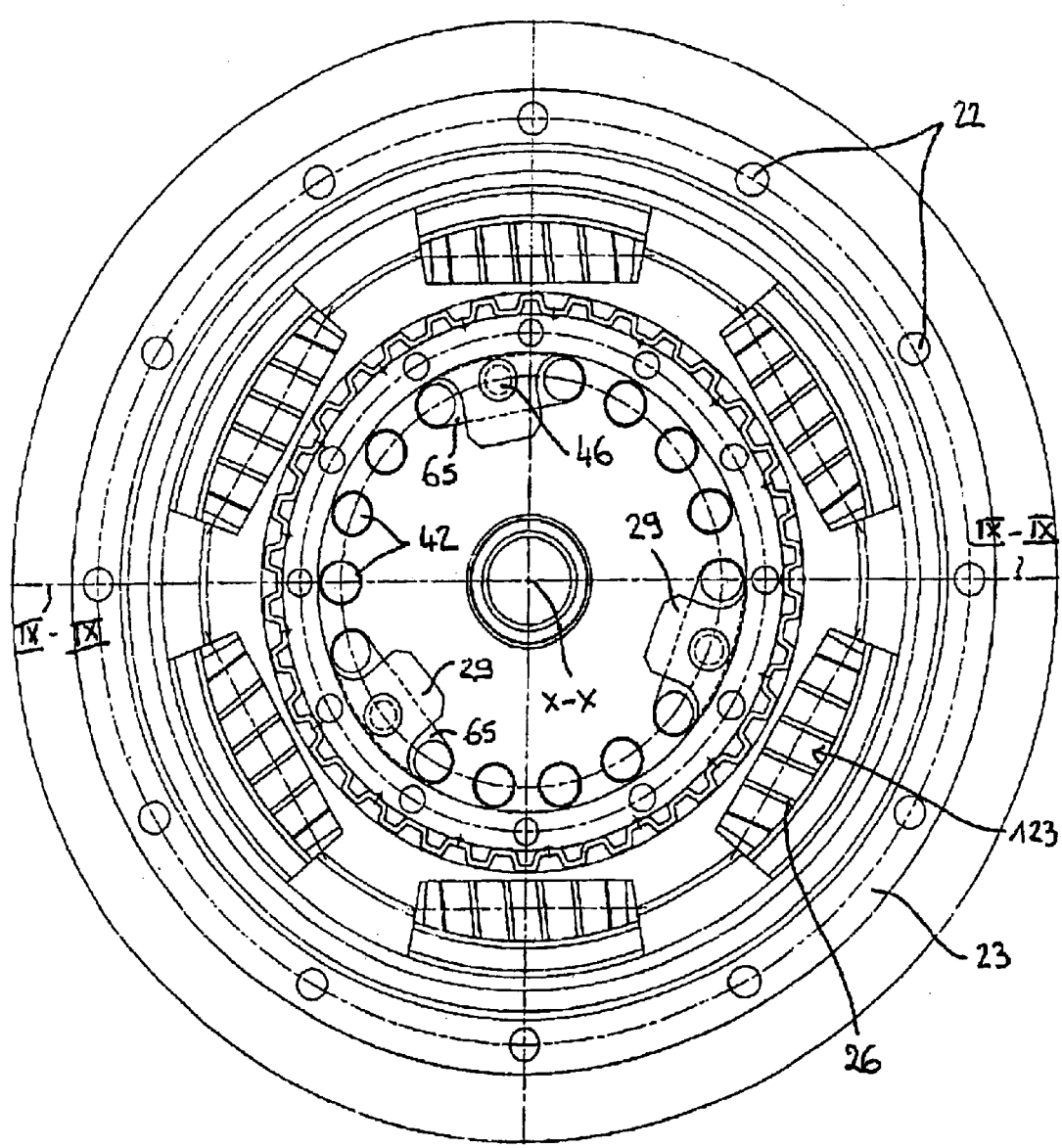

FIGS. 8 to 10 illustrate a second embodiment according to the invention in which the stop means 40 of the damping device 20 are formed by spacers 46 arranged radially below elastic members 26 and which limit the relative angular movement between the guidance washers 21, 23 and the damper plate 25.

In a variant, in the second embodiment which will be described below, the spacers 46 can be riveted only to the front 23 and rear 21 guidance washers so as to form a unitary subassembly able to be handled and transported before it is mounted in the apparatus 10.

Such a variant can in particular be envisaged when the damper 20 is produced in a first site and the final mounting of the damper 20 in the apparatus takes place in another industrial site.

It is then necessary to provide an axial clearance between the rear lateral face of the guidance washer 21 and the front lateral face of the radially internal part of the turbine wheel 12, the clearance being substantially equivalent to the thickness of the rear rivet heads of the spacers 46.

According to the second embodiment, the spacers 46 are riveted to the front guidance washers 23 and to the assembly consisting of the rear guidance washer 21, the turbine wheel 12 and the plate 140 of the hub 14 and can move in apertures 65 in the damper plate 25.

The apertures 65 consist for example of oblong or kidney-shaped holes which extend circumferentially, the distance between the opposite circumferential ends of the apertures 65 determining the maximum relative angular movement between the guidance washers 21, 23 and the mounting plate 25 which makes it possible to compress the elastic members 26 and thus obtain the damping of the torsion oscillations.

The spacers 46 thus comprise axially in front a first rivet 246 whose head is in abutment on the front lateral face of the front guidance washer 23 and at the rear a second rivet 146 whose head is in abutment on the rear lateral face of the rear guidance washer 21, the second rivet 146 of the spacer 46 then replaces the rivet 42 of the rotational connection without clearance according to the invention.

More precisely, the spacers 46 comprise axially from rear to front a rear rivet 246 whose head is in abutment on the rear lateral face of the plate 140, a rivet body 246 passing through the radially internal part 120 of the turbine wheel 12, the plate 140 of the turbine hub 14 and the rear guidance washer 21, and then a central body of the spacer 46 with the largest diameter passing through the apertures 65, the body of the front rivet 246 with the same diameter as the rear rivet 147 passing through the front guidance washer 23, the heads of the front rivets 246 being in abutment on the front lateral face of the guidance washer 23.

The first change in diameter between the body of the rear rivet 146 and the central body of the spacer 46 defines a first collar delimiting a rear face which is in abutment against the front lateral face of the rear guidance washer 21, in a similar manner to the front heads 41 of the rivets 42.

In a similar fashion, the second change in diameter occurring between the central body of the spacer 46 and the body of the front rivet 246 defines the second collar whose front face is in abutment against the rear lateral face of the front guidance washer 21.

The guidance washers 21, 23 are therefore held axially respectively between on the one hand the heads of the front rivets 246 and the front face of the second collar and on the other hand the rear face of the first collar and the rear rivets 146.

The rotational connection without clearance between the radially internal part 120 of the turbine wheel 12, of the plate 140 of the turbine hub 14 and of the rear guidance washer 21 is therefore obtained on the one hand by means of the axial rivets 42 and on the other hand by means of the rivets 246 of the spacers 46.

Axially from rear to front, the radially internal part 120 of the turbine wheel 12, the plate 140 of the turbine hub 14 and the rear guidance washer 21 have passing through them the bodies of the rivets 42 and 246 whose rear heads are in abutment on the rear lateral face of the plate 140, the front heads 142 of the rivets 42 being in abutment on the front natural face of the rear guidance washer 21.

The second connecting piece 38 of the clutch 30 is attached by rivets 42, or in a variant by welding, to the front guidance washer 21.

The number of spacers 46 circumferentially distributed in a regular manner in alternation with the rivets 42 depends on the application and in particular on the torque to be transmitted by means of the damper 20.

Thus this second embodiment constitutes an alternative to the first embodiment, which will be preferred to it for higher torques.

As can be seen in FIG. 9, the front guidance washer 23 briefly comprises a radially internal part in the form of lugs 29, solely in the areas where spacers 46 are provided.

In a variant, the front guidance washer 23 comprises a radially internal circumferentially continuous part rather than lugs 29, openings similar to the openings 55 in the damper plate 25 then being provided in the front guidance washer 23 for the axial passage of the riveting tools.

Between each of these areas the guidance washer 23 is delimited radially towards the inside at the second connecting piece 38, with which it is rotationally integral through the rivets 24.

The lugs 29 on the guidance washer 23 extend radially towards the inside beyond the spacers 46 and are bent so that they are offset axially towards the rear and may or may not be in abutment on the damper plate 25.

Between each of the lugs 29, it is therefore possible, as in the first embodiment, to gain access to the rivets 42 through the holes 55 in order to mount and effect the connection without clearance of the turbine wheel 12.

As can be seen in FIGS. 9 and 10, the guidance washers 21, 23 extend radially towards the outside beyond the damper plate 25 and comprise an external part offset axially so that the guidance washers are pressed together so as to be able to be rotationally connected together, here by circumferentially distributed rivets 22.

In FIG. 10 the lugs 29 are in abutment on the damper plate 25 produced in a single piece with the hub 27 and the spacers 46 are here in three in number, distributed regularly at 120°.

Figure 11:
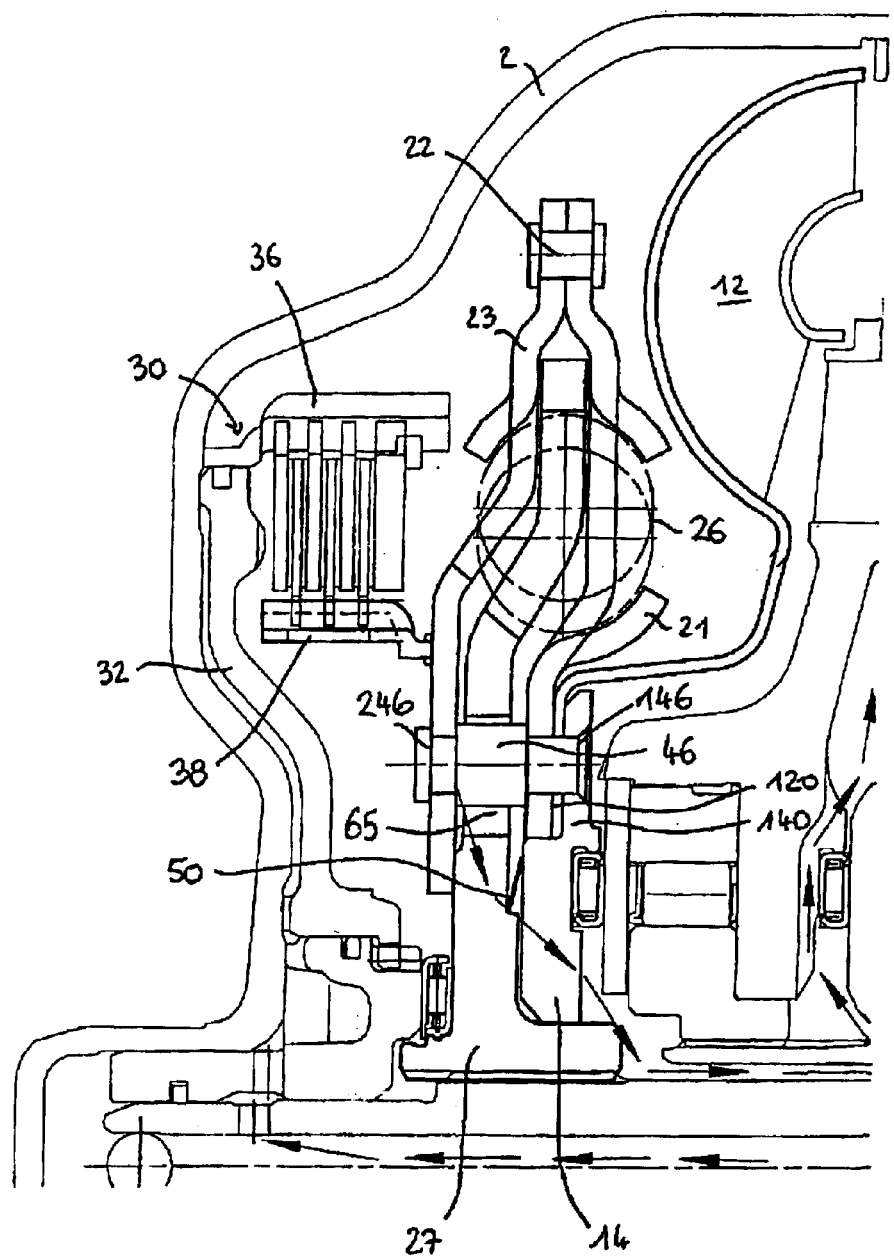
FIG. 11 is a half view in axial section of a hydrokinetic coupling apparatus which illustrates a first variant of the second embodiment, in which the second connecting piece is attached to the guidance washer and which comprises friction means with axial elasticity arranged between the two hubs.

FIG. 11 illustrates a first variant of the second embodiment, in which:

the second connecting piece 38 of the lock-up clutch 30 is fixed to the front guidance washer 23 by friction welding;

the radially internal part of the guidance washer 23 forming the lugs 29 extends perpendicular overall to the axis X—X in line with the front lateral face of the damper plate 25, the damper plate 25 being maintained axially in contact with the lugs 29 under the action of friction means 50 with axial elasticity interposed between the two hubs 27 and 14, as described for FIG. 4.

Figure 12:
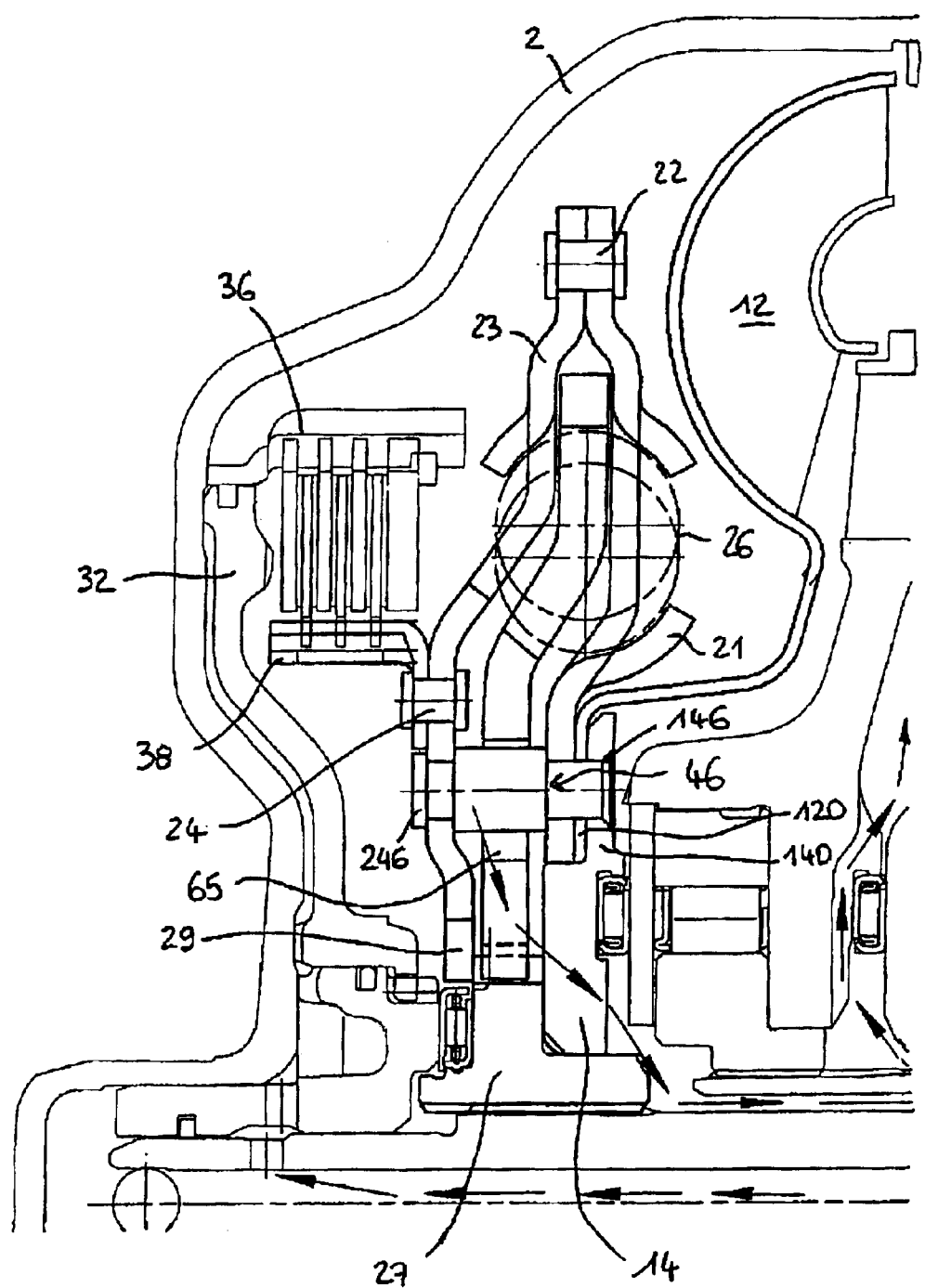
FIGS. 12 to 14 illustrate a second variant of the second variant embodiment, in which the damper plate and the output hub of the damper are produced in two parts connected rotationally, the front guidance washer comprising means such as axial holding lugs for the output hub of the damper.
Figure 13:
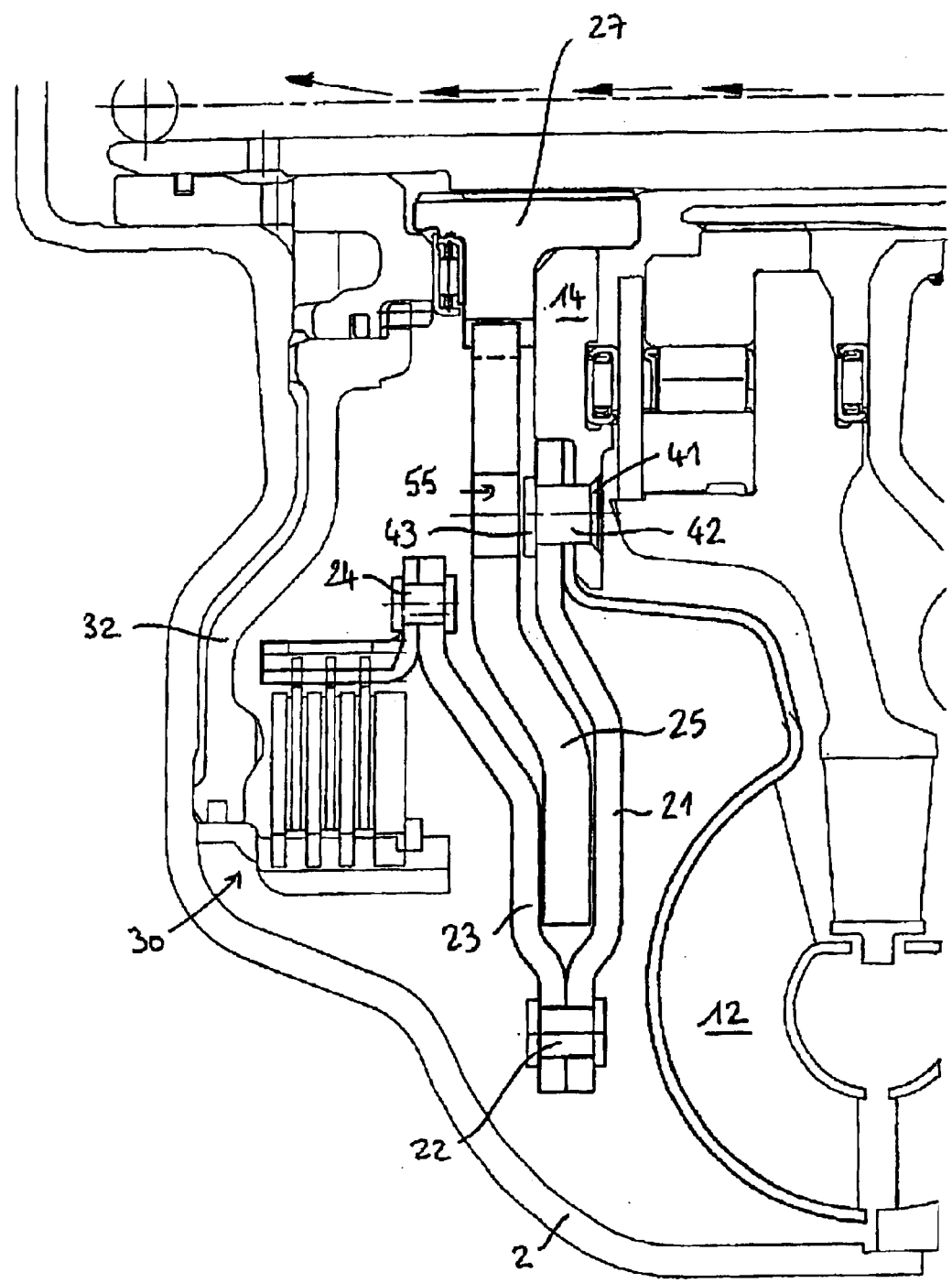
Figure 14:
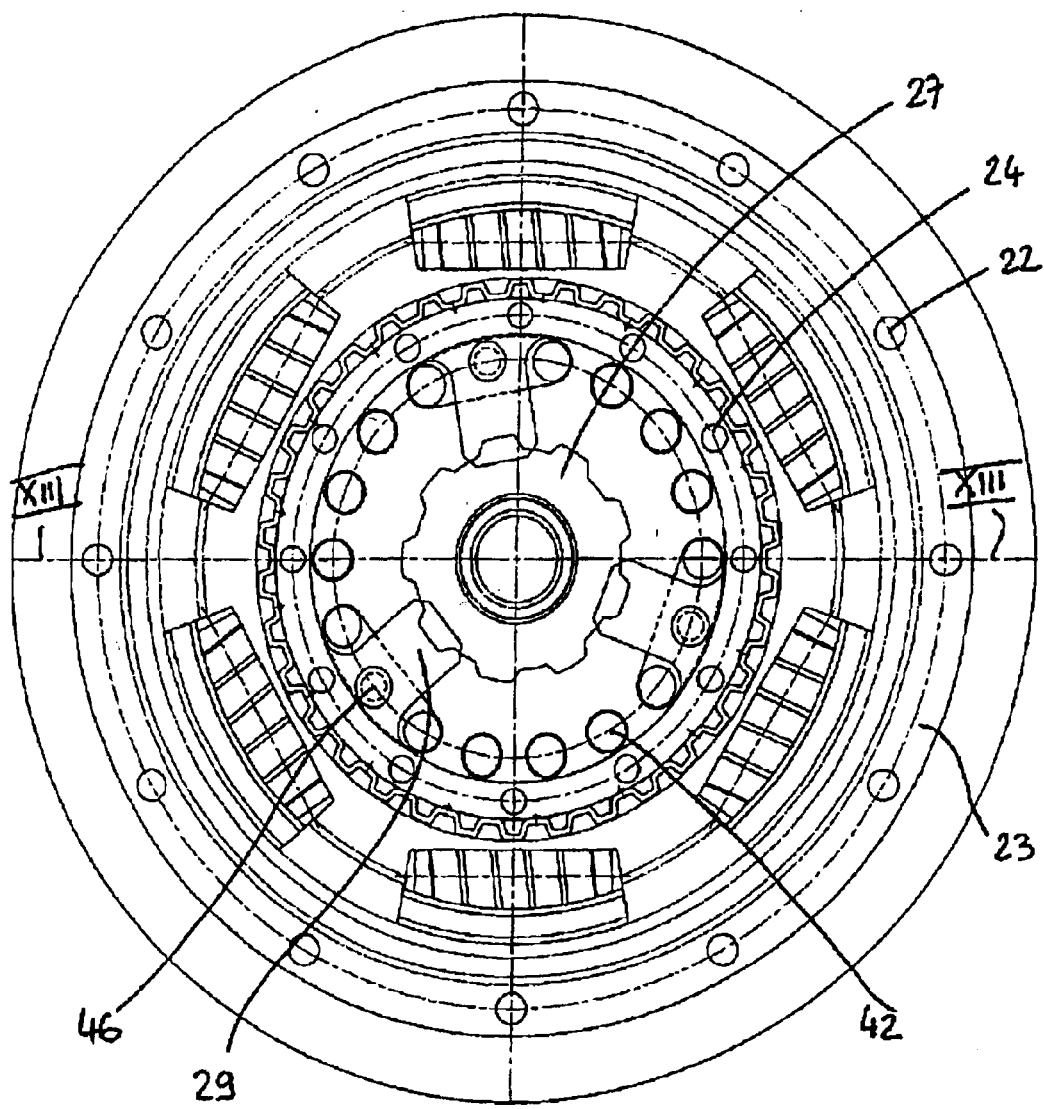

FIGS. 12 to 14 illustrate a second variant of the second embodiment, in which:

the second connecting piece 38 is fixed to the front guidance washer 23 by rivets 24;

the damper plate 25 and the output hub 27 of the damper 20 are produced in two parts and rotationally connected by meshing the lugs 29 of the guidance washer 23 constitute means of fixing or axial positioning of the hub 27.

Figure 15:
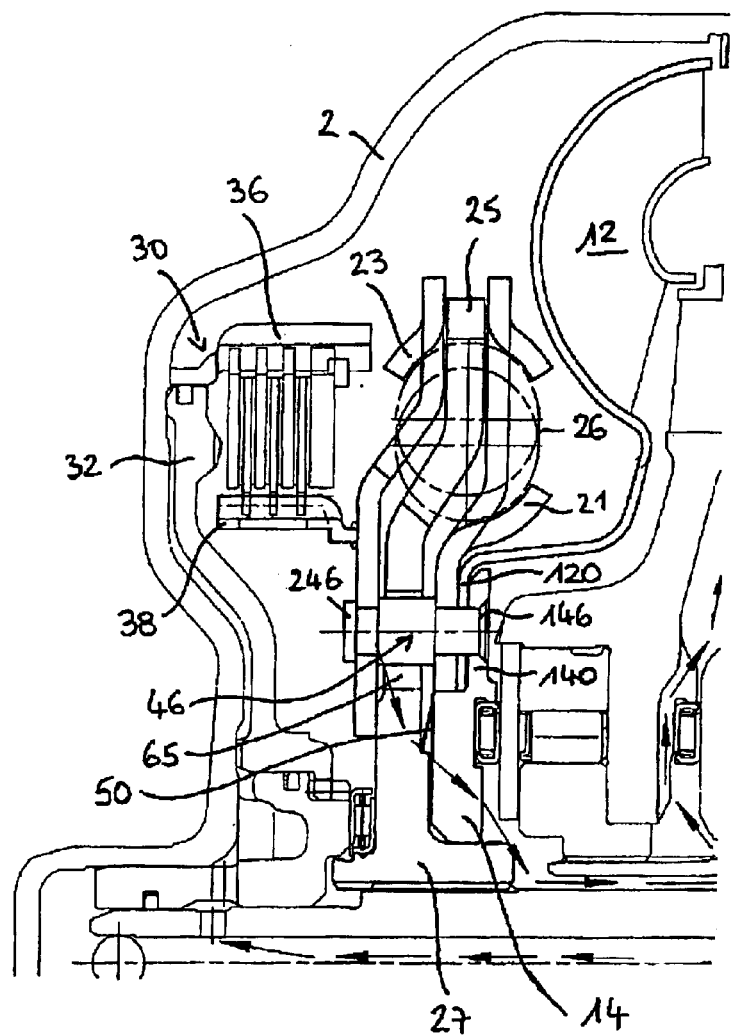
FIG. 15 is a half view in axial section of a hydrokinetic coupling apparatus which illustrates a third variant of the second embodiment, in which the means of connecting the guidance washers in rotation consists solely of the spacers forming stop means.

FIG. 15 is similar to FIG. 11 and illustrates a third variant embodiment of the second embodiment, in which the rivets 22 providing the fixing together of the guidance washers 21, 23 have advantageously been omitted.

The external radial periphery of the guidance washers 21, 23 extends parallel to the damper plate 25 and the damper is therefore no longer closed radially on the outside.

The implementation of this variant depends on the application.

It is in particular possible when the spacers 46 provide mechanical strength of the elements of the damper 20, to do this the number of spacers 46 can be increased.

Figure 16:
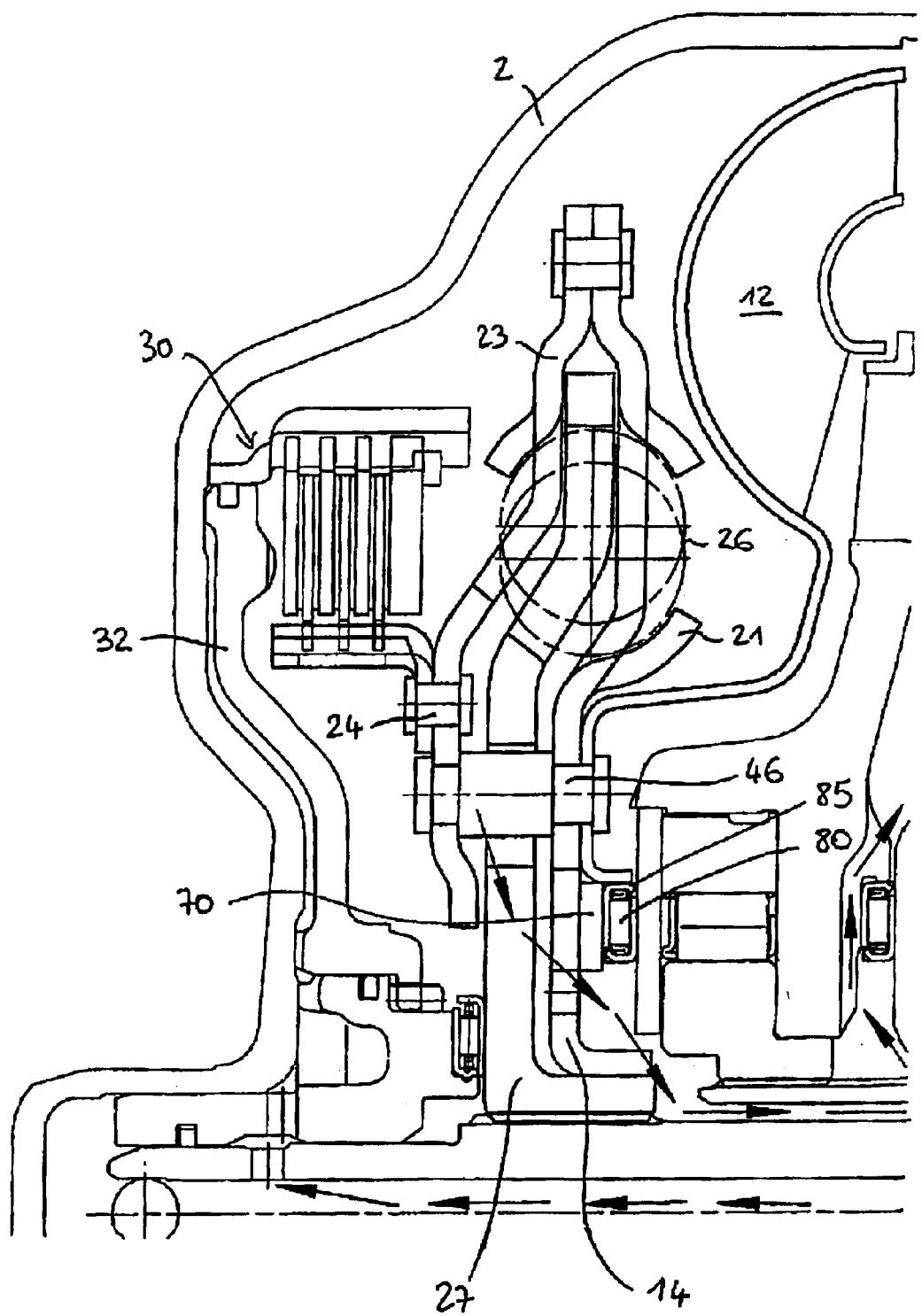
FIGS. 16 and 17 are views in axial section across two different cross-sections of a hydrokinetic coupling apparatus which illustrate a fourth variant of the second embodiment, in which the turbine hub is produced in a single piece with the rear guidance washer.
Figure 17:
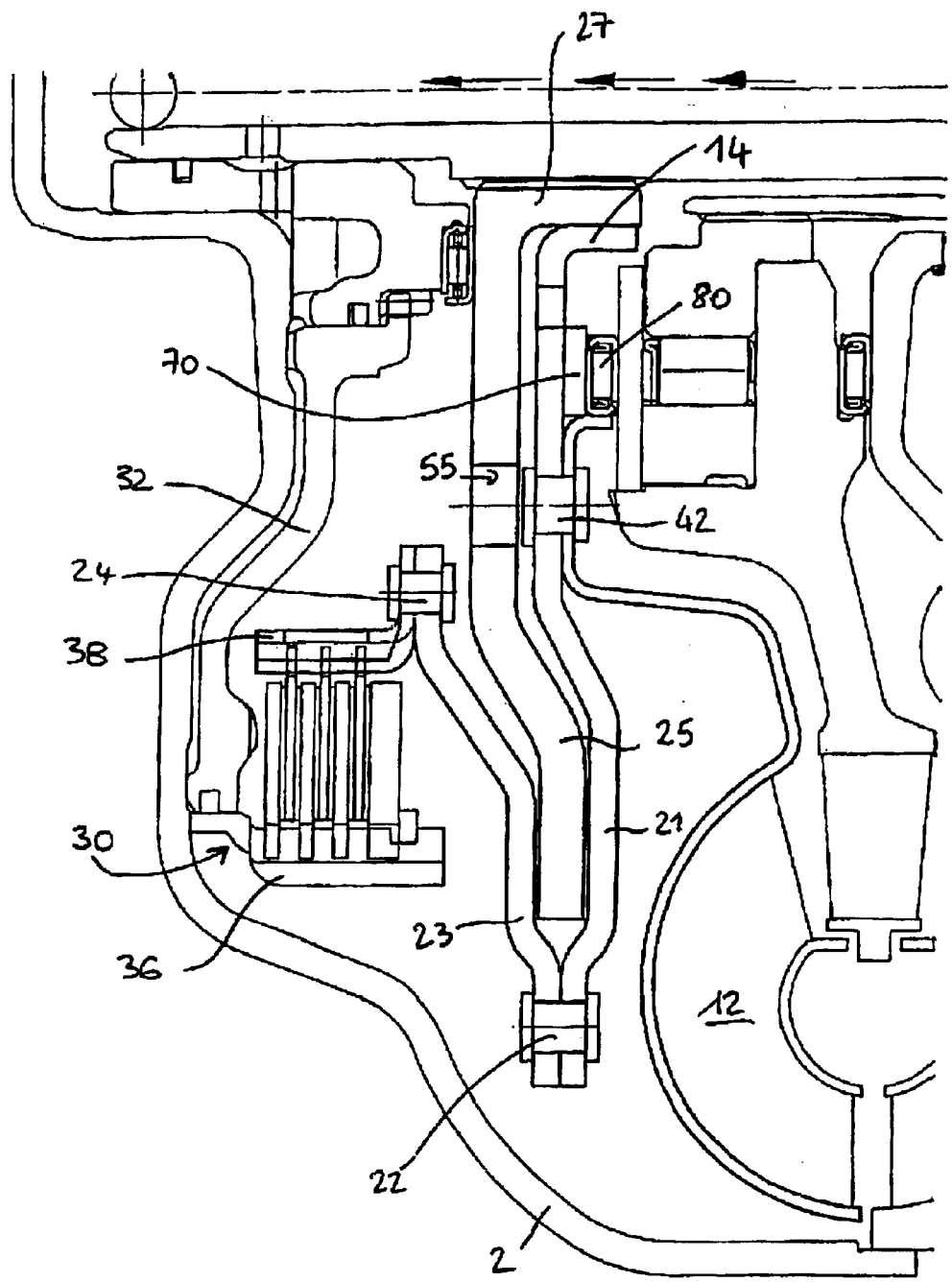

FIGS. 16 and 17 illustrate a fourth variant for an apparatus according to the second embodiment and one of the variants.

According to this variant embodiment, the damper plate 25 is made from thick sheet metal produced in one piece with the output hub 27 on the damper 20, and the damper plate of the turbine wheel 14 consists of the rear guidance washer 21 which extends radially inwards as far as the bearing of the output hub 27, on which it is mounted so as to rotate freely, like the hub 14 previously.

In a similar manner to the variant of the first embodiment illustrated in FIG. 5, the guidance washer 21 is treated for example by carbonitriding, which may give rise to defects in surface evenness.

This is the reason why a shim 70 is provided, interposed between the part of the washer 21 forming a turbine hub 14 and bearing means such as a needle thrust bearing 80. The needle thrust bearing 80 is fixed to the turbine wheel 12, here by crimping, as described in FIG. 5 of the first embodiment.

FIGS. 18 and 19 illustrate a third embodiment combining the teachings of the first and second embodiments, in which there are provided on the one hand stop means 40 produced in the form of lugs 44 as described for FIGS. 1 to 3 of the first embodiment and on the other hand spacers 46 interposed between the guidance washers 21, 23 and the damper plate 25.

The spacers 46 can move angularly in the apertures 65 but do not here constitute the stop means 40 of the damper 20, the spacers 46 make it possible to hold and position the guidance washers 21, 23 axially with respect to the damper plate 25.

Advantageously, the front guidance washer 23 is extended radially towards the inside by lugs 29 which make it possible to hold the hub 27 axially, in particular when the hub 27 is distinct from the damper plate 25.

Naturally, the teachings of the present invention are not limited to a hydrokinetic coupling apparatus where the lock-up clutch is of the multi-disc type but could be transposed to hydrokinetic coupling apparatus in which the lock-up clutch is of the single-face type, such as for example in the document FR-A-2.525.711 or of the two-face type as in the document FR-A-2.816.019.

What is claimed is:

1. Hydrokinetic coupling apparatus {10} with an axis of rotation X—X for motor vehicles, comprising:

a casing (1, 2) formed by a first shell (1) and intended to rotationally connect a driving shaft (A1) and an impeller wheel (11);

a turbine wheel (12) rotationally fixed, through a connection without clearance by axial rivets (42), to a turbine hub (14) which is able to be rotationally connected to a driven shaft (A2) by means of an input element (21, 23) of a damping device (20) whose output element (25, 27) is rotationally fixed to said driven shaft (A2);

a clutch (30) for locking the coupling of the driving and driven shafts, acting between the turbine wheel (12) and a second shell (2) of the casing, and comprising an axially movable piston (32) to clamp at least one friction disc (34) rotationally fixed on the one hand to the second shell (2) of the casing by means of a first connecting piece (36) and on the other hand to the damping device (20) by means of a second connecting piece (38);

the damping device (20) comprising circumferentially acting elastic members (26) interposed between two guidance washers (21, 23) forming the input element and a damper plate (25) which is fixed to a hub (27) of the damping device (20) forming the output element, the input and output elements being rotationally connected with a capacity for angular movement which is limited by stop means (40), wherein bearing means (80) are axially interposed between turbine hub (14) and a hub of a reaction wheel (13), and wherein the turbine hub (14) and one of the guidance washers (21) are formed as a single homogenous element.

2. Hydrokinetic coupling apparatus (10) according to claim 1, characterised in that at least the damper plate (25) of the damping device (20) comprises openings (55) for the axial passage of riveting tools.

3. Hydrokinetic coupling apparatus (10) according to claim 1, further comprising spacers (46) which axially position the guidance washers (21, 23) and the damper plate (25, 27) of the damping device (20).

4. Hydrokinetic coupling apparatus (10) according to claim 3, wherein at least some of the rivets (42) are extended axially forwards in order to form said spacers (46).

5. Hydrokinetic coupling apparatus (10) according to claim 4, a front free end of the spacers (46) forms an axial rivet for crimping the front guidance washer (21).

6. Hydrokinetic coupling apparatus (10) according to claim 3, characterised in that the stop means (40) consist of circumferential apertures (65) in the damper plate (25) which each have the body (47) of a spacer (46) passing through them axially.

7. Hydrokinetic coupling apparatus (10) according to claim 1, characterized in that the stop means (40) comprise at least one radial lug (44) fixed to the external radial periphery of the damper plate (25, 27) which is received with circumferential clearance (J) in a housing (144).

8. Hydrokinetic coupling apparatus (10) according to claim 1, characterised in that the front guidance washer (21) comprises means (29) forming an axial stop towards the front of the hub (27), with the front lateral face (271) of which the means (29) cooperates.

9. Hydrokinetic coupling apparatus (10) according to claim 1, characterised in that the turbine hub (14) includes an internal radial portion of the rear guidance washer (23).

* * * * *